(12) United States Patent
Yamamoto

(10) Patent No.: US 12,691,930 B2
(45) Date of Patent: Jul. 28, 2026

(54) VEHICLE CONTROL DEVICE

(71) Applicant: TOYOTA JIDOSHA KABUSHIKI KAISHA, Toyota (JP)

(72) Inventor: Yusuke Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/985,053

(22) Filed: Dec. 18, 2024

(65) Prior Publication Data

US 2025/0296620 A1     Sep. 25, 2025

(30) Foreign Application Priority Data

Mar. 19, 2024     (JP) ................................. 2024-043343

(51) Int. Cl.
B61L 1/00         (2006.01)
B62D 5/04         (2006.01)
(52) U.S. Cl.
CPC ........... B62D 5/046 (2013.01); B62D 5/0481 (2013.01)
(58) Field of Classification Search
CPC .......... B60L 1/00; B62D 5/046; B62D 5/0481
See application file for complete search history.

(56) References Cited

U.S. PATENT DOCUMENTS

| | | | |
|---|---|---|---|
| 2004/0128042 A1* | 7/2004 | Takahashi ............ | B62D 5/0403 |
| | | | 180/443 |
| 2004/0243287 A1 | 12/2004 | Yanaka et al. | |
| 2020/0180685 A1* | 6/2020 | Suzuki ................. | B62D 5/0412 |
| 2020/0207408 A1* | 7/2020 | Nakamura ............. | B62D 5/049 |
| 2021/0394825 A1* | 12/2021 | Kakimoto .............. | B62D 5/006 |
| 2022/0388569 A1* | 12/2022 | Uchino ................ | B62D 5/0463 |
| 2022/0410966 A1* | 12/2022 | Fujita ..................... | B62D 6/002 |

FOREIGN PATENT DOCUMENTS

| | | |
|---|---|---|
| JP | 2004-358997 A | 12/2004 |
| JP | 2014-201128 A | 10/2014 |

* cited by examiner

*Primary Examiner* — Long T Tran
(74) *Attorney, Agent, or Firm* — SoraIP, Inc.

(57)         ABSTRACT

A vehicle control device mounted on a vehicle, comprising: a first determination unit that determines whether a steering angle of a steering wheel and a turning angle of a steered wheel are in a synchronous state; a second determination unit that determines whether or not the vehicle is in a travelable state; and a control unit that controls power supply to a first device related to traveling of the vehicle, wherein the control unit stops power supply to the first device when the steering angle and the turning angle are not in a synchronous state and the vehicle is in a travelable state.

3 Claims, 4 Drawing Sheets

VEHICLE CONTROL DEVICE

CROSS-REFERENCE TO RELATED APPLICATION

This application claims priority to Japanese Patent Application No. 2024-043343 filed on Mar. 19, 2024, incorporated herein by reference in its entirety.

BACKGROUND

1. Technical Field

The present disclosure relates to a vehicle control device mounted in a vehicle.

2. Description of Related Art

Japanese Unexamined Patent Application Publication No. 2004-358997 (JP 2004-358997 A) discloses an automobile mounted with a redundant control device, with the intention of improving reliability and reducing a failure rate. JP 2004-358997 A describes technology that avoids the entire control from lapsing into a malfunction due to redundancy when a failure occurs in a steering control by a steer-by-wire system.

SUMMARY

In a steer-by-wire system that electrically controls a steered wheel (tire) based on an operation of steering (a steering wheel), a synchronization process is performed that eliminates a deviation between a steering angle of the steering wheel and a turning angle of the steered wheel. The synchronization process is a process that controllably matches the steering angle of the steering wheel and the turning angle of the steered wheel when a system power source of the vehicle is turned on (such as when a start-stop button is pressed) or when a specific electronic control unit is reset processed. Since a vehicle is in a state in which an operation of the steering wheel is not transmitted to the steered wheel (hereinafter, called a "free-steer state") during the time period when the synchronization process is performed, a necessary control is performed so that the vehicle is not in a travelable state.

However, even if the steer-by-wire system is normal, if an abnormality occurs in a travel control system of the vehicle due to, for example, a sticking failure of a start request signal or the like, the vehicle may travel without the vehicle intentionally being in a travelable state. Therefore, there is further room for a technique of vehicle control in a free-steer state.

The present disclosure has been made in view of the above problem, and the present disclosure has an objective to provide a vehicle control device that can suppress a vehicle from traveling unintentionally in a free-steer state in which a steering angle of a steering wheel and a turning angle of a steered wheel are not in a synchronous state.

In order to solve the problem, one aspect of technology of the present disclosure is a vehicle control device mounted in a vehicle, the vehicle control device including a first determination unit that determines whether a steering angle of a steering wheel and a turning angle of a steered wheel are in a synchronous state, a second determination unit that determines whether the vehicle is in a travelable state, and a control unit that controls a power supply to a first device related to traveling of the vehicle, in which when the steering angle and the turning angle are not in a synchronous state and the vehicle is in a travelable state, the control unit stops a power supply to the first device.

According to the vehicle control device of the present disclosure, when the vehicle is in a travelable state when a steering angle of a steering wheel and a turning angle of a steered wheel are in a non-synchronized free-steer state, a power supply to a device related to traveling of the vehicle is stopped. Accordingly, a vehicle can be suppressed from traveling unintentionally in a free-steer state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The vehicle control device of the present disclosure turns OFF the power of the electronic control unit that is responsible for the travel control of the vehicle when the vehicle becomes in a travelable state (READY-ON state) when the steering angle of the steering wheel and the turning angle of the steered wheel are not synchronized (free-steer state). Thus, the vehicle control device of the present disclosure forcibly stops the operation of the electronic control unit. Accordingly, it is possible to prevent the vehicle from unintentionally traveling in the free-steer state.

Hereinafter, an embodiment of the present disclosure will be described in detail with reference to the drawings.

Embodiment

Configuration

Figure 1:
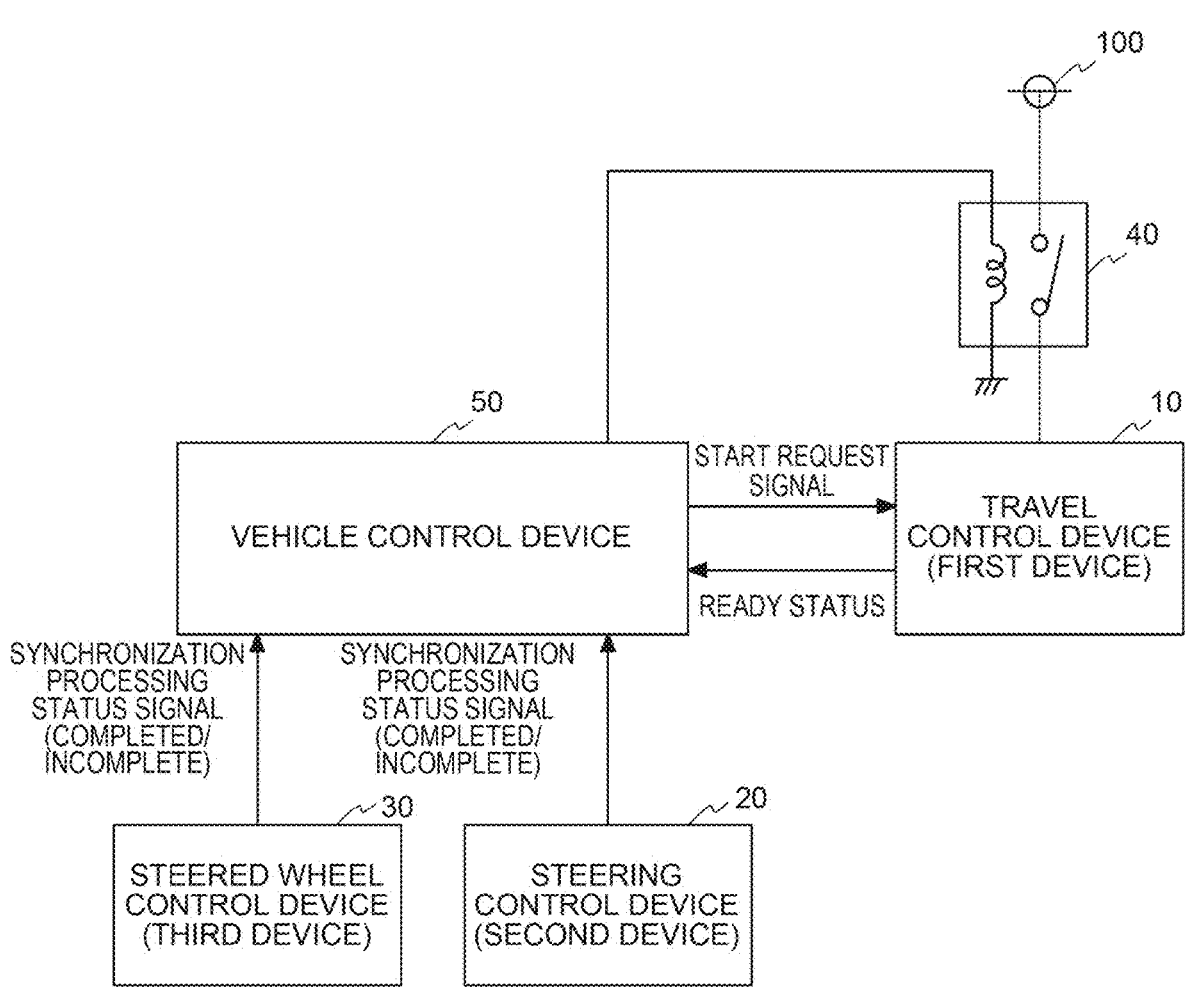
FIG. 1 is a functional block diagram of a vehicle control device and a peripheral portion thereof according to an embodiment of the present disclosure.

FIG. 1 is a functional block diagram of a vehicle control device 50 and a peripheral portion thereof according to an embodiment of the present disclosure. The functional block illustrated in FIG. 1 includes a travel control device 10, a steering control device 20, a steered wheel control device 30, an ignition relay 40, and a vehicle control device 50.

The travel control device 10, the steering control device 20, the steered wheel control device 30, the ignition relay 40, and the vehicle control device 50 may be mounted on a electrified vehicle such as a battery electric vehicle (BEV).

The travel control device 10 (first device) is an electronic control unit (ECU: Electronic Control Unit) for controlling a vehicle, and is an electronic control device capable of performing control related to the travel of the vehicle. The travel control device 10 is configured to operate by electric power supplied from the power supply unit 100 connected when the ignition relay 40 is in a conductive state. The travel control device 10 transmits, to the vehicle control device 50, a multiplex communication signal indicating that the vehicle is in a non-travelable condition (READY-OFF) until a start-up requesting signal is received from the vehicle control device 50. Upon receiving the start request signal from the vehicle control device 50 and completing a predetermined process required for traveling, the travel control device 10 transmits a multiplex communication signal indicating that the vehicle is in a travelable state (READY-ON) to the vehicle control device 50. Signals (multiplex communication signals) indicating READY-OFF and READY-ON are transmitted and received via an in-vehicle network such as a CAN (Controller Area Network). An example of the travel control device 10 is a BEV-ECU.

The steering control device 20 (second device) is an electronic control unit (ECU) that controls steering of wheels that change the traveling direction of the vehicle based on a steering angle corresponding to a rotational manipulation of a steering wheel (not shown) by a driver of the vehicle. The steering control device 20 periodically transmits, to the vehicle control device 50, a synchronization processing state signal (multiple communication signal) indicating a state of the synchronization processing on the steering side when a synchronization processing for controllably matching the steering angle of the steering wheel and the turning angle of the steered wheel (not shown) is performed. Examples of the synchronization processing state signal include "synchronization completion signal" and "synchronization incomplete signal" and "undetermined signal". The synchronization completion signal indicates that the synchronization process is completed. The synchronization incomplete signal indicates that the synchronization process is not completed. The undetermined signal indicates that the completion/incompleteness of synchronization has not been determined during initialization processing immediately after power-on or the like. The synchronization process status is transmitted and received via an in-vehicle network such as CAN.

The steered wheel control device 30 (third device) is an electronic control unit (ECU) that controls the steering angle of the steered wheels in accordance with the turning angle of the steering wheel. The steered wheel control device 30 periodically transmits, to the vehicle control device 50, a synchronization processing state signal (multiple communication signal) indicating a state of the synchronization processing on the steering wheel side when a synchronization processing for controlling and matching the steering angle of the steering wheel and the turning angle of the steered wheel is performed. The synchronization processing state signal may take the synchronization completion signal, the synchronization incomplete signal, and the undetermined signal as described above. The synchronization process status is transmitted and received via an in-vehicle network such as CAN.

The ignition relay 40 is, for example, a single-pole, single-throw excitation type mechanical relay, and is provided between the power supply unit 100 and the travel control device 10 (power supply line). The coil portion of the ignition relay 40 is connected to the vehicle control device 50 by a dedicated line, and drive control is performed by the vehicle control device 50.

The vehicle control device 50 is an electronic control unit (ECU) that controls the system of the vehicle, and is an electronic control unit that is capable of controlling the power supply of the vehicle. The vehicle control device 50 confirms that a synchronization completion signal is received as a synchronization processing state signal from both the steering control device 20 and the steered wheel control device 30 when a synchronization process for controlling the steering angle of the steering wheel and the turning angle of the steered wheel is performed, and transmits a start request signal to the travel control device 10. A dedicated line is used to transmit the start request signal. The vehicle control device 50 may receive READY status (READY-OFF or READY-ON) from the travel control device 10. The vehicle control device 50 controls the driving of the ignition relay 40 in accordance with READY status and the synchronization process status signal (synchronization completion signal or synchronization incomplete signal). As the vehicle control device 50, a matching ECU can be exemplified. The driving control of the ignition relay 40 performed by the vehicle control device 50 will be described later.

The above-described electronic control units (ECU) are typically configured to include a processor, memories, an input/output interface, and the like. The program stored in the memory is read and executed by the processor to realize the respective functions performed by the travel control device 10, the steering control device 20, the steered wheel control device 30, the vehicle control device 50, and the like. Control Next, with further reference to FIG. 2, FIG. 3, and FIG. 4, control performed by the vehicle control device 50 according to an embodiment of the present disclosure will be described.

Figure 2:
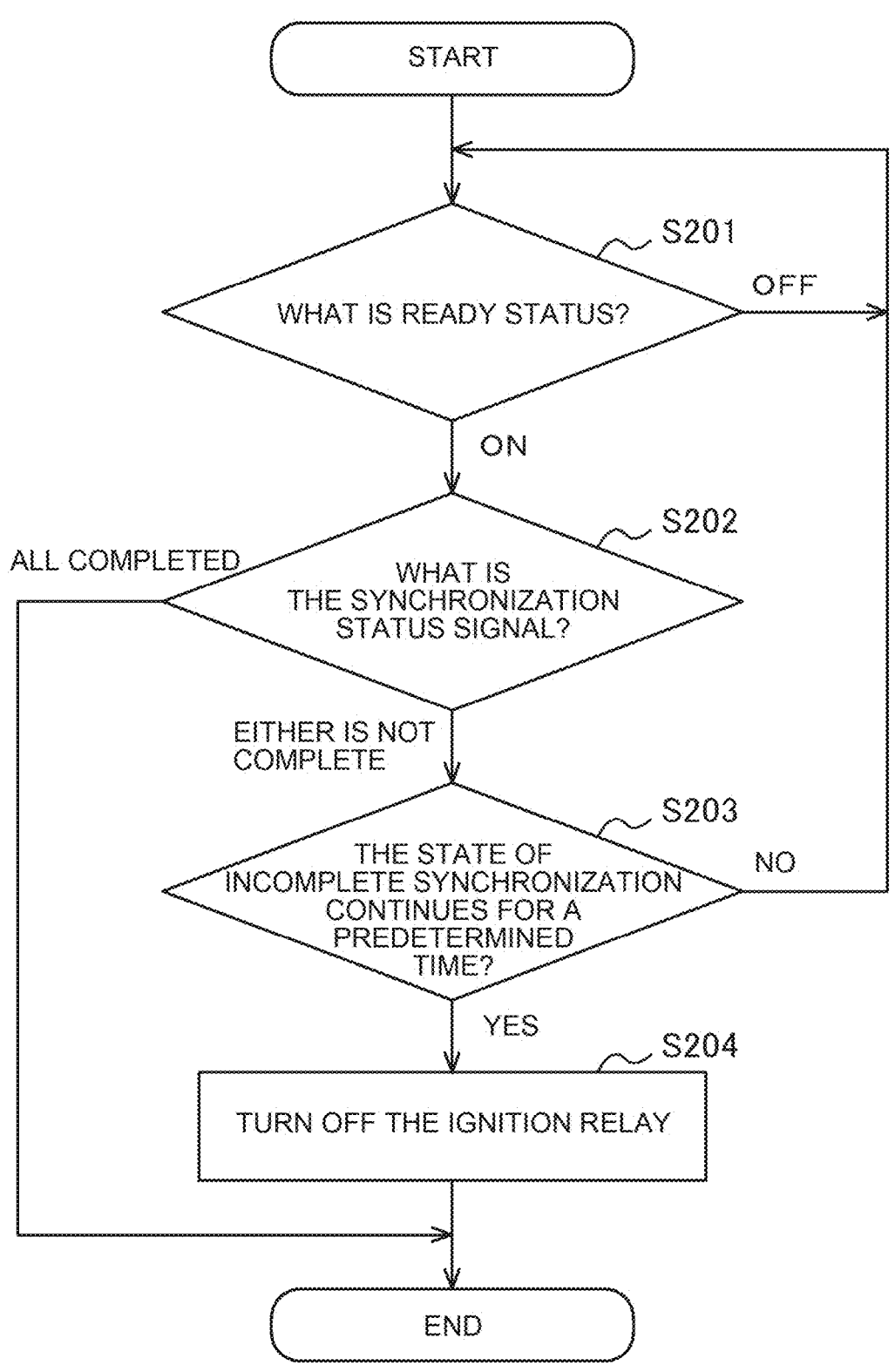
FIG. 2 is a processing flowchart of power supply control executed by the vehicle control device.

FIG. 2 is a flow chart for explaining a process sequence of power supply control (IG off-control when synchronization is not completed) executed by the vehicle control device 50. The power supply control illustrated in FIG. 2 is started at a timing (for example, at the time of power-on of the vehicle system or at the time of resetting of a specific electronic control unit) at which a synchronization process for controllably matching the steering angle of the steering wheel and the turning angle of the steered wheel is required.
S201

The vehicle control device 50 determines READY condition received from the travel control device 10. That is, the vehicle control device 50 determines whether READY status is "READY-OFF" or "READY-ON". This determination is made in order to determine whether the vehicle is in a travelable state. This determination is performed, for example, periodically at predetermined intervals.

When READY status received by the vehicle control device 50 is READY-OFF (S201, OFF), the vehicle control device waits until the READY status is ON. On the other hand, when READY status received by the vehicle control device 50 is READY-ON (S201, ON), the process proceeds to S202.
S202

The vehicle control device 50 confirms the synchronization processing state signal received from both the steering control device 20 and the steered wheel control device 30. Specifically, the vehicle control device 50 determines whether a synchronization completion signal has been received from both the steering control device 20 and the steered wheel control device 30. This determination is made in order to determine whether or not the synchronization process for controllably matching the steering angle of the steering wheel and the turning angle of the steered wheel has been normally completed. This determination is performed, for example, periodically at predetermined intervals in the same manner as the determination of READY status in S201.

When the vehicle control device 50 receives the synchronization completion signal from both the steering control device 20 and the steered wheel control device 30 (S202, all completion), the power supply control ends. On the other hand, when the vehicle control device 50 has not yet received the synchronization completion signal from both the steering control device 20 and the steered wheel control device 30 (S202, either of which is incomplete), the process proceeds to S203.

S203

The vehicle control device 50 determines whether or not the synchronization between the steering angle of the steering wheel and the turning angle of the steered wheel has not been completed has continued for a predetermined time. Specifically, the vehicle control device 50 determines whether a predetermined period of time has elapsed since READY status is READY-ON and the synchronization incomplete signal outputted from either the steering control device 20 or the steered wheel control device 30 is recognized for the first time. This determination is made in order to reliably determine that the vehicle is in a travelable state when the steering angle of the steering wheel and the turning angle of the steered wheel are in a free-steer state in which the steering angle is not synchronized. The predetermined period can be appropriately set on the basis of a time lag of the synchronization completion signal, a process delay from the reception of the start request signal by the travel control device 10 until the transmission of READY-ON, and the like. The synchronization completion signal is a signal received by the vehicle control device 50 from each of the steering control device 20 and the steered wheel control device 30.

When the vehicle control device 50 determines that the synchronization between the steering angle of the steering wheel and the turning angle of the steered wheel has not been completed for a predetermined period of time (S203, Yes), the process proceeds to S204. On the other hand, when the vehicle control device 50 determines that the synchronization between the steering angle of the steering wheel and the turning angle of the steered wheel is not completed for a predetermined period of time (S203, No), the process proceeds to S201.

S204

The vehicle control device 50 shuts off the ignition relay 40 because the vehicle is in a travelable state when the vehicle is in the free-steer state. Specifically, the vehicle control device 50 stops the driving output of the ignition relay 40 to the coil portion, and causes the contact portion of the ignition relay 40 to be in the open state. Due to the interruption of the ignition relay 40, the power supply from the power supply unit 100 to the travel control device 10 stops, and the operation of the travel control device 10 stops.

When the ignition relay 40 is shut off by the vehicle control device 50, this power supply control ends.

Figure 3:
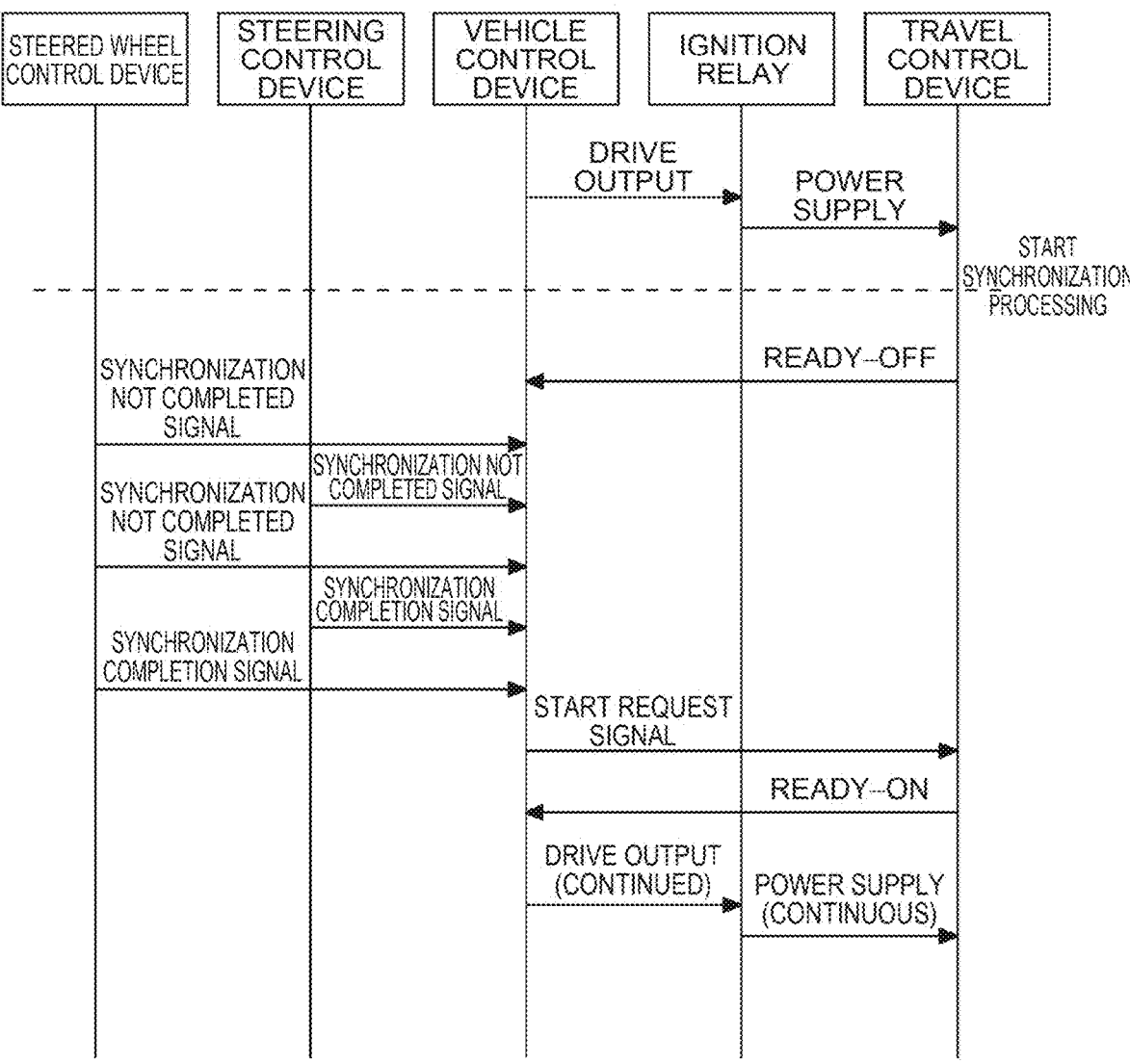
FIG. 3 shows an exemplary sequencing of a free-steer state in which the vehicles cannot travel.

FIG. 3 shows an exemplary sequencing when the vehicle is in a normal state (READY-OFF) in which the vehicle cannot travel in a free-steer state in which the steering angle of the steering wheel and the turning angle of the steered wheel are not synchronized.

As shown in FIG. 3, if the vehicle cannot be in a travelable state until the completion of synchronization is determined by receiving the synchronization completion signal from the steering control device 20 and the steered wheel control device 30, the vehicle control device 50 shifts to the normal vehicle control while keeping the ignition relay 40 conductive.

Figure 4:
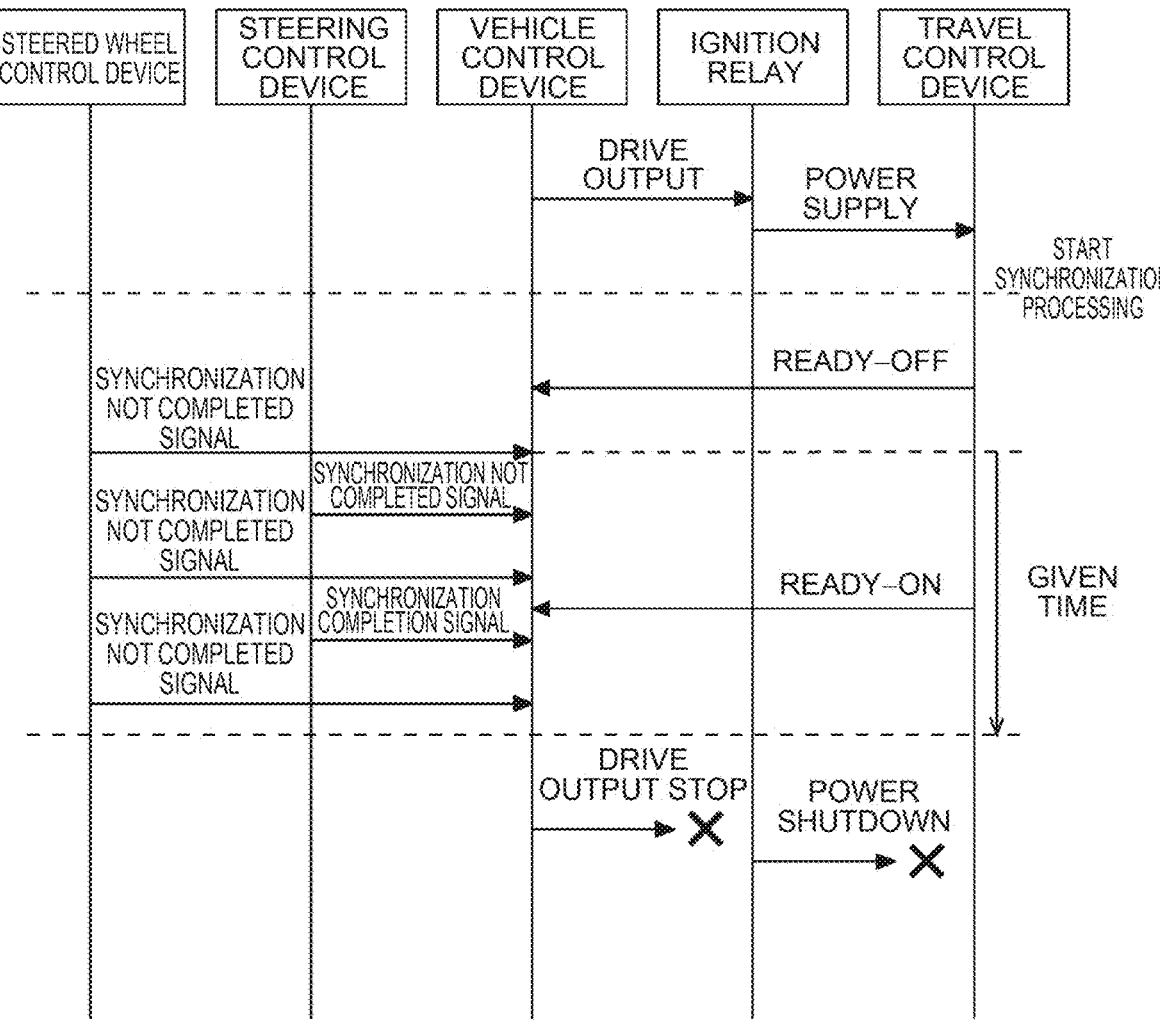
FIG. 4 is an example of a sequence when the vehicle is in a travelable state in a free-steer state.

FIG. 4 is a diagram illustrating an example of an abnormal state (READY-ON) in which the vehicle is in a travelable state in a free-steer state in which the steering angle of the steering wheel and the turning angle of the steered wheel are not synchronized.

As shown in FIG. 4, when the vehicle is in a travelable state in which there is no synchronization completion signal (asynchronous) from the steered wheel control device 30, the vehicle control device 50 performs control to shut off the ignition relay 40 after waiting for a lapse of a predetermined time from the time when the synchronization incomplete signal is first received (from the steered wheel control device 30). The interruption of the ignition relay 40 is performed by stopping the drive output to the coil unit, and accordingly, the operation of the travel control device 10 is stopped. By this control, it is possible to prevent the vehicle from traveling unintentionally in the free-steer state.

Operations and Effects

As described above, according to the vehicle control device 50 according to the embodiment of the present disclosure, when the vehicle becomes in a travelable state (READY-ON) in a state in which the synchronization process between the steering angle of the steering wheel in the steering control device 20 and the turning angle of the steered wheel in the steered wheel control device 30 is not completed, the ignition relay 40 is shut off and the power supply from the power supply unit 100 to the travel control device 10 is stopped (IG off-control when synchronization is not completed).

This control can forcibly stop the operation of the travel control device 10 that performs the control related to the travel of the vehicle even when a situation occurs in which the vehicle is in a travelable state during a period in which the steering angle of the steering wheel and the turning angle of the steered wheel are not synchronized due to a failure or the like. Therefore, it is possible to suppress the vehicle from unintentionally traveling in a free-steer state in which the steering wheel operation is not reflected in the direction of the wheel (tire). In addition, by adopting this control, it is possible to minimize the scale of change of the existing system in the vehicle.

In the above-described power supply control, when the vehicle is in a travelable state in a free-steer state in which the steering angle of the steering wheel and the turning angle of the steered wheel are not synchronized, a predetermined period of time is determined from the time when the synchronization incomplete signal is first received, and the interruption control of the ignition relay 40 is performed (S204 from S203). However, in this case, there is a small possibility that the vehicle travels in a state in which the steering operation of the vehicle is not effective. Therefore, when the vehicle is in a travelable state in the free-steer state, control may be performed so as to immediately shut off the ignition relay 40 without waiting for a lapse of a predetermined time.

Application Example

In the above embodiment, a case has been described in which the vehicle equipped with the respective components of the travel control device 10, the steering control device 20, the steered wheel control device 30, the ignition relay 40, and the vehicle control device 50 is an electrified vehicle. However, each of the above-described configurations can also be mounted on a vehicle equipped with an internal combustion engine such as an engine. In this case, whether or not the vehicle is in a travelable state can be determined based on not READY state (READY-ON) but the rotational speed of the engine (for example, the rotational speed is equal to or greater than a predetermined value) and an idle state signal indicating that the engine is under idle control.

Further, in the above-described embodiment, as a measure for preventing the vehicle from traveling, the control of shutting off the ignition relay 40 and stopping the power supply from the power supply unit 100 to the travel control device 10 has been described. However, in addition to this procedure, it is possible to prevent the vehicle from traveling, for example, by stopping the output of the driving force by a system that performs the powertrain control.

Although an embodiment of the present disclosure has been described above, the present disclosure can be regarded as a power control method executed by a vehicle control device including not only a vehicle control device but also a processor and a memory, a control program for executing the power control method, a computer-readable non-transitory storage medium storing the control program, and a vehicle equipped with the vehicle control device.

The vehicle control device of the present disclosure can be used in a vehicle equipped with a steer-by-wire system that electrically controls a steering wheel.

What is claimed is:

1. A vehicle control device mounted in a vehicle, the vehicle control device comprising:
   a first processor configured to:
      determine whether a steering angle of a steering wheel and a turning angle of a steered wheel are in a synchronous state; and
      determine whether the vehicle is in a travelable state;
   a second processor configured to:

transmit, to the first processor, a multiplex communication signal indicating that the vehicle is in a non-travelable condition until a start-up requesting signal is received from the first processor; and
      transmit, to the first processor, a multiplex communication signal indicating that the vehicle is in the travelable state in response to receiving the start request signal from the first processor and completing a predetermined process for traveling;
   a power supply unit; and
   an ignition relay provided between the power supply unit and the second processor,
   wherein the first processor is configured to stop a power supply from the power supply unit to the second processor by shutting off the ignition relay in a case where the first processor determines that the steering angle and the turning angle are not in the synchronous state and determines that the vehicle is in the travelable state.

2. The vehicle control device according to claim 1, wherein in a case where the first processor determines that the steering angle and the turning angle are not in the synchronous state and determines that the travelable state of the vehicle continues for a predetermined time, the first processor shuts off the ignition relay.

3. The vehicle control device according to claim 1, wherein the first processor is configured to determine that the steering angle and the turning angle are in the synchronous state by receiving a synchronization completion signal from both a second device that controls the steering wheel and a third device that controls the steered wheel.

* * * * *